United States Patent
Xie et al.

(10) Patent No.: US 10,377,639 B2
(45) Date of Patent: Aug. 13, 2019

(54) PREPARATION METHOD FOR DIRECTLY SYNTHESIZING TITANIUM DIOXIDE FROM TITANIUM-RICH ORGANIC PHASE PREPARED FROM ILMENITE

(71) Applicant: Fujian Kuncai Material Technology Co., Ltd., Fuqing (CN)

(72) Inventors: Bingkun Xie, Fuqing (CN); Zhicheng Cao, Fuqing (CN); Jiwei Chen, Fuqing (CN); Ming Fei, Fuqing (CN)

(73) Assignee: Fujian Kuncai Material Technology Co., Ltd. (CN)

( * ) Notice: Subject to any disclaimer, the term of this patent is extended or adjusted under 35 U.S.C. 154(b) by 271 days.

(21) Appl. No.: 15/508,603

(22) PCT Filed: Feb. 6, 2015

(86) PCT No.: PCT/CN2015/072440
§ 371 (c)(1),
(2) Date: Mar. 3, 2017

(87) PCT Pub. No.: WO2016/037462
PCT Pub. Date: Mar. 17, 2016

(65) Prior Publication Data
US 2019/0084838 A1    Mar. 21, 2019

(30) Foreign Application Priority Data

Sep. 11, 2014  (CN) ........................ 2014 1 0459835

(51) Int. Cl.
C01G 23/00    (2006.01)
C01G 23/053   (2006.01)
C01G 23/047   (2006.01)
C01G 49/00    (2006.01)
C01G 49/10    (2006.01)
C09D 7/61     (2018.01)
C08K 3/22     (2006.01)

(52) U.S. Cl.
CPC ....... C01G 23/0536 (2013.01); C01G 23/001 (2013.01); C01G 23/047 (2013.01); C01G 23/0475 (2013.01); C01G 49/0009 (2013.01); C01G 49/10 (2013.01); C09D 7/61 (2018.01); C01P 2006/80 (2013.01); C08K 2003/2241 (2013.01)

(58) Field of Classification Search
CPC .............. C01G 23/047; C01G 23/001; C01G 23/0536; C01G 49/0009

USPC ............... 423/70, 610, 82, 85, 139
See application file for complete search history.

(56) References Cited

U.S. PATENT DOCUMENTS

| | | | |
|---|---|---|---|
| 3,236,596 A | 2/1966 | Zirngibl et al. | |
| 4,269,809 A | 5/1981 | Tolley et al. | |
| 6,375,923 B1 | 4/2002 | Duyvesteyn et al. | |
| 6,500,396 B1 | 12/2002 | Lakshmanan et al. | |
| 10,059,845 B2* | 8/2018 | Xie ......................... | C09C 1/24 |
| 2006/0074173 A1* | 4/2006 | Kogoi ....................... | A61K 8/29 |
| | | | 524/497 |
| 2010/0086454 A1* | 4/2010 | Cooke .................. | C01G 23/047 |
| | | | 423/82 |
| 2013/0247978 A1* | 9/2013 | Cho ....................... | B82Y 30/00 |
| | | | 136/256 |

FOREIGN PATENT DOCUMENTS

| | | |
|---|---|---|
| CN | 1217298 A | 5/1999 |
| CN | 1766137 A | 5/2006 |
| CN | 101935063 A | 1/2011 |
| CN | 102602991 A | 7/2012 |
| CN | 102616842 A | 8/2012 |
| CN | 103382530 A | 11/2013 |
| CN | 104192898 A | 12/2014 |

OTHER PUBLICATIONS

Chen, et al, "Preparation of TiO2 nanometer powders from industrial titanium sulphate solution" J. of Inorganic Chemistry, vol. 11, No. 3, Sep. 30, 1995, pp. 228-231. (Year: 1995).*
Chen, Dairong et al., Preparation of TiO2 Nanometer Powders from Industrial Titanium Sulphate Solution, Journal of Inorganic Chemistry, vol. 11, No. 3, Sep. 30, 1995, (Sep. 30, 1995), pp. 228-231.
International Search Report, International Application No. PCT/CN2015/072440.

* cited by examiner

*Primary Examiner* — Steven J Bos
(74) *Attorney, Agent, or Firm* — Kramer Levin Naftalis & Frankel LLP

(57) ABSTRACT

The present invention relates to a method for directly synthesizing titanium dioxide from a titanium-rich organic phase prepared from ilmenite, and more particularly to a method in which a titanium-rich acidolysis solution is obtained by an efficient ore dissolving technology, titanium ions are transferred to the organic phase by means of an effective titanium extractant to obtain a high-purity and titanium-rich organic phase, and then the titanium dioxide is directly synthesized in the organic phase. With this method, the dissolution rate of ilmenite can be effectively improved, the process flow is shortened and production costs are reduced, and titanium dioxide with high yield and high quality is obtained.

14 Claims, 1 Drawing Sheet

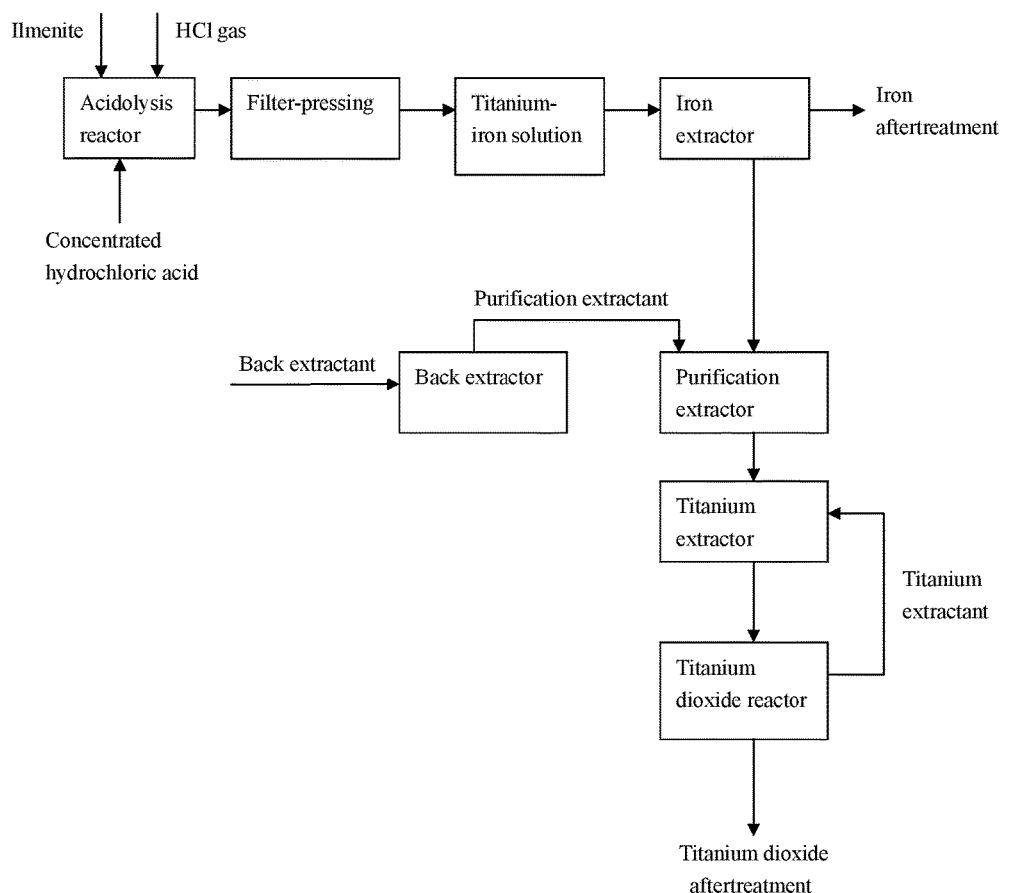

PREPARATION METHOD FOR DIRECTLY SYNTHESIZING TITANIUM DIOXIDE FROM TITANIUM-RICH ORGANIC PHASE PREPARED FROM ILMENITE

TECHNICAL FIELD

The present invention relates to a method for directly synthesizing titanium dioxide from a titanium-rich organic phase prepared from ilmenite, and more particularly to a method by which a titanium-rich acidolysis solution is obtained by a highly-efficient ore-dissolving technology, titanium ions are transferred to an organic phase by means of an effective titanium extractant to obtain a high-purity and titanium-rich organic phase, and then the titanium dioxide is directly synthesized in the organic phase.

BACKGROUND ART

Titanium dioxide is considered to be a white pigment with the best performance in the world at present, which is widely used in industrial fields such as coatings, plastics, paper making, printing inks, chemical fibers, rubbers, cosmetics and the like. The titanium dioxide is prepared by using titanyl sulfate and titanium tetrachloride as the raw material. However, titanium is mainly derived from ilmenite which is an ore mainly used for refining titanium. At present, the titanium tetrachloride or the titanyl sulfate is mainly prepared by chlorination or sulfuric acid method followed by distillation for impurities removal. Chlorination comprises the following steps: high-titanium slags and petroleum coke are mixed at a certain proportion and then crushed, and chlorine is introduced to carry out reaction, in order to generate titanium tetrachloride gas which is then condensed to obtain a liquefied titanium tetrachloride liquid, the latter is filtered and distillated to obtain the titanium tetrachloride finished product. The sulfuric acid method is carried out using sulfuric acid for infiltration of ore to produce a large amount of waste acid and ferrous sulfate.

With the development of society and the energy-saving emission reduction call of the country, research and exploration for the new preparation processes and technologies of the titanium dioxide raw materials are inevitable. The method of dissolving ilmenite with hydrochloric acid has also attracted wide interest. At present, the study on dissolution of the ilmenite with hydrochloric acid is divided into two kinds, one of which is served as the former step of the sulfuric acid method, at the condition of high temperature and low acid ore ratio, impurities in the ilmenite are dissolved out, the titanium is precipitated out in form of metatitanic acid after being dissolved, and used as a raw material for the next step of sulfuric acid dissolution, see such as patents CN 1766137A, CN 101935063A, CN 102602991A, CN 102616842A and the like; the other of which is using hydrochloric acid for acidolysis directly, and then extracting and separating titanium oxychloride out, see such as U.S. Pat. Nos. 3,236,596, 4,269,809, 6,500,396B1, 6,375,923, CN1217298A and the like. Although some work and research has been done at home and abroad for that, as well as certain limitations for the dissolution rate and concentration of the ore, production of the titanium dioxide should be achieved by some high energy consumption steps such as heating, concentration and hydrolysis, and the titanium dioxide raw material product basically exists in the aqueous phase, which is difficult to ensure the purity of the titanium dioxide. Therefore, higher requirements for the highly-efficient preparation of high-yield and high-quality titanium dioxide technology have been put forward.

SUMMARY OF THE INVENTION

It is an object of the present invention to provide a method for directly synthesizing titanium dioxide from a titanium-rich organic phase prepared from ilmenite. The key technology lies in a method by which a titanium-rich acidolysis solution is obtained by means of an efficient ore dissolving technology, titanium ions are transferred to the organic phase with an effective titanium extractant to obtain a high-purity and titanium-rich organic phase, and then the titanium dioxide is directly synthesized in the organic phase.

According to a first embodiment of the present invention, provided is a method for directly synthesizing titanium dioxide from a titanium-rich organic phase by using hydrochloric acid/ilmenite as the raw material, followed by acid solution, impurity extraction, extraction, separation and purification, i.e., a method for directly synthesizing titanium dioxide from a titanium-rich organic phase prepared from ilmenite or a method for directly synthesizing titanium dioxide from a titanium-rich organic phase, which comprises the following steps:

(1) adding the hydrochloric acid and the ilmenite to a reactor at a certain acid/mineral mass ratio, introducing hydrogen chloride gas into the system (continuously or discontinuously) so that the pressure P in the system was higher than the atmospheric pressure, maintaining the system for reaction (e.g., 2-15 hours, preferably 4-12 hours, such as 6 or 9 hours) under stirring at a raised temperature T1 and a pressure P above the atmospheric pressure (thus at a certain acidity), after the reaction is completed, reducing the temperature of the reaction mixture (for example, the temperature was reduced to room temperature from (25° C.) to 40° C.), and adding an oxidizing agent thereto for stirring (for example, from 10 minutes to 5 hours, preferably from 50 minutes to 3 hours, such as 1 hour or 1.5 hours), followed by filter-pressing to obtain a filtrate, i.e. a hydrochloric acid solution A0 containing titanium ferric ion;

(2) adding the solution A0 of step (1) into an iron extractor for multi-stage extraction with an iron extractant, and combining various stages of extracts as organic phases to obtain an iron-rich extraction liquid, i.e. an organic phase A1, wherein the aqueous phase obtained from the multi-stage extraction is an iron ion-free titanium-containing raffinate, i.e. an aqueous phase B1;

(3) adding the iron-rich extraction liquid A1 into an iron backwash extractor, and back-extracting iron ions with an iron back extractant to obtain an organic phase A2 and a raffinate B2 as a ferric chloride-containing aqueous phase, and optionally, the resulting organic phase A2 was used as an iron back-extractant after acid washing or was returned to the iron extractant;

(4) adding the iron ion-free titanium-containing raffinate B1 into a purification extractor, and then carrying out multi-step purification with a purification extractant to remove coloured ions such as manganese and vanadium ions so as to obtain a titanium-enriched aqueous raffinate C1;

(5) adding the titanium-enriched aqueous raffinate C1 into a titanium extractor to obtain an organic phase C2 containing high-purity titanium ions; then, allowing it to enter a titanium dioxide synthesis reactor directly, adding a precipitant into the system to prepare a titanium precipitate; finally, obtaining the titanium dioxide through aftertreatment.

In the method of the present invention, a high concentration of titanium-rich solution was obtained by means of maintaining the system at a certain pressure and acid value by continuously introducing hydrogen chloride gas into the reaction system of a certain hydrochloric acid/ilmenite ratio for sufficiently and effectively dissolving the ore.

Generally speaking, the ilmenite in step (1) is ilmenite concentrate, ilmenite, high titanium slag or modified ilmenite concentrate, which is preferably the ilmenite concentrate, ilmenite, high titanium slag or modified ilmenite concentrate with a titanium dioxide content of 30-80 wt %, preferably 40-70 wt %, and more preferably 45-65 wt %.

Generally speaking, the concentration of hydrochloric acid in step (1) is from 25 wt % to 45 wt %, preferably from 28 wt % to 44 wt %, further preferably from 30 wt % to 42 wt %, even further preferably from 32 wt % to 40 wt %, and more preferably from 33 wt % to 37 wt %.

In step (1), hydrogen chloride is introduced in to maintain the pressure P of the reactor to be in a range of from 0.101 MPa to 2.5 MPa or from 0.1015 MPa to 2.5 MPa, preferably from 0.102 MPa to 2.0 MPa, preferably from 0.2 MPa to 1.6 MPa, preferably from 0.3 MPa to 1.5 MPa, preferably from 0.4 MPa to 1.4 MPa, preferably from 0.5 MPa to 1.3 MPa, further preferably from 0.6 MPa to 1.2 MPa, and even further preferably from 0.8 MPa to 1.2 MPa.

Preferably, the acid/ore mass ratio in step (1) is 1-15:1, preferably 1.5-12:1, further preferably 2-10:1, preferably 3-9:1, even further preferably 4-8:1, and still further preferably 5-7:1.

The reaction temperature T1 in step (1) is, for example, in a range of from 30° C. to 90° C., preferably from 40° C. to 80° C., and more preferably from 50° C. to 75° C.

Preferably, the reaction time in step (1) is from 2 hours to 12 hours, preferably from 3 hours to 11 hours, further preferably from 4 hours to 10 hours, even further preferably from 5 hours to 9 hours, and still further preferably from 6 hours to 8 hours.

Preferably, an oxidizing agent is added 0.5 to 1 hour before the end of the reaction in step (1).

The oxidizing agent used in step (1) is selected from one or more of potassium chlorate, sodium chlorate, hydrogen peroxide, sodium peroxide, potassium peroxide, sodium percarbonate, potassium percarbonate, oxygen or air, preferably potassium chlorate, sodium chlorate or air.

Generally speaking, the iron extractant in step (2) is selected from one or more of tributyl phosphate TBP, di(1-methylheptyl) methylphosphonate P350, methyl isobutyl ketone MIBK, trioctylamine TOA, secondary carbon primary amine N1923 (i.e., $R^1R^2CHNH_2$, $R^1$ or $R^2$ is each independently $C_9$-$C_{11}$ alkyl), methylbenzene, isoamyl alcohol or sulfonated kerosene, preferably from one or two of tributyl phosphate TBP, secondary carbon primary amine N1923, trioctylamine TOA, methylbenzene and sulfonated kerosene.

Generally speaking, step (2) or step (3) or step (4) is carried out at a temperature of from 20° C. to 60° C., preferably from 25° C. to 55° C., more preferably from 30° C. to 50° C. Step (5) or (6) is carried out at a temperature (T2 or T3) of from 60° C. to 95° C., preferably from 65° C. to 90° C., more preferably from 70° C. to 90° C., and still more preferably from 75° C. to 85° C.

The mass ratio of the extractant and the titanium-iron hydrochloric acid solution A0 in step (2) is generally 1-6:1, preferably 1.3-5:1, further preferably 1.5-4:1, more preferably 1.8-3:1, and even further preferably 2-2.5:1.

The iron back extractant in step (3) is selected from one or two of deionized water or dilute acid, preferably 0.5-10 wt %, and preferably 1-5 wt % of dilute hydrochloric acid.

Preferably, the mass ratio between the iron back extractant and the iron-rich extraction liquid A1 in step (3) is 3-12:1, preferably 4-10:1, further preferably 5-9:1, and even further preferably 6-8:1.

Preferably, the titanium extractant in step (4) is selected from one or more of tributyl phosphate TBP, trioctylamine TOA, amyl acetate, bis(2-ethylhexyl) phosphate P204, methylbenzene, dimethylbenzene, isoamyl alcohol and sulfonated kerosene. The mass ratio between the purification extractant and the iron ion-free titanium-containing raffinate B1 in step (4) is 1-6:1, preferably 1.3-5:1, further preferably 1.5-4:1, more preferably 1.8-3:1, and even further preferably 2-2.5:1.

Preferably, the titanium extractant in step (5) is selected from one or more of tributyl phosphate TBP, trioctylamine TOA, amyl acetate, bis(2-ethylhexyl) phosphate P204, methylbenzene, dimethylbenzene, isoamyl alcohol and sulfonated kerosene. The mass ratio between the extractant and the titanium-enriched aqueous raffinate C1 in step (5) is 1-6:1, preferably 1.3-5:1, further preferably 1.5-4:1, more preferably 1.8-3:1, and even further preferably 2-2.5:1.

The base in the alkali solution in step (5) is selected from one or more of sodium hydroxide, aqueous ammonia, and sodium carbonate.

Generally, the content of the contaminating or variegated metals in the obtained titanium-enriched extraction liquid C2 is less than 10 ppm, preferably less than 8 ppm, more preferably less than 6 ppm, further preferably less than 5 ppm, most preferably less than 4 ppm, and more preferably less than 2 ppm.

Further, the content of the contaminating metals in the obtained raffinate B2 is less than 15 ppm, more preferably less than 12 ppm, further preferably less than 10 ppm, most preferably less than 8 ppm, more preferably less than 6 ppm, and more preferably less than 4 ppm.

Purity of the resulting titanium dioxide is greater than 99.99 wt %, the content of impurities of other metals (particularly colored metals) is less than 10 ppm, preferably less than 8 ppm, more preferably less than 6 ppm, further preferably less than 5 ppm, most preferably less than 4 ppm, and more preferably less than 2 ppm.

According to a first embodiment of the present invention, the use of the titanium dioxide in the fields of paints, printing inks, plastics, ceramic materials, leather coloring, wallpaper, powder coatings or cosmetics is provided. The "reactor" and "extractor" of the present invention are the commonly used devices in the art. The "extraction", "back extraction", "milling", "beating", "stirring", "filter-pressing under reduced pressure" are commonly used by those skilled in the art. "Optionally" means carrying out or not. Unless otherwise specified, all professional and scientific terms used herein have the same meanings as commonly understood by those skilled in the art to which this invention belongs. The technical methods, which are not described in detail herein, are those commonly used in the art.

The reagents used in the present invention, such as "hydrochloric acid", "potassium chlorate", "sodium chlorate", "hydrogen peroxide", "tributyl phosphate TBP" and "di(1-methylheptyl) methylphosphonate P350, "methyl isobutyl ketone MIBK", "trioctylamine TOA", "secondary carbon primary amine N1923", "toluene", "isoamyl alcohol", "sulfonated kerosene", "deionized water", "dilute hydrochloric acid", "tri-butyl phosphate TBP", "trioctyl amine TOA", "amyl acetate", bis(2-ethylhexyl) phosphate P204", "dimethylbenzene", "isoamyl alcohol", "sodium hydroxide", "ammonia water" and "sodium carbonate" are all common commercially available materials.

The modified titanium concentrate used in the present invention means a titanium concentrate subjected to oxidizing roasting and reduction roasting, such as being provided by Ansteel Company in China.

Advantages of this Invention

1. It is the first time for the method to be used for synthesizing the titanium dioxide directly from the titanium-rich organic phase, and the purity of the titanium dioxide is at least one order of magnitude higher than that of the products obtained by other methods.

2. With this method, the dissolution rate of the ilmenite can be effectively improved, the process flow is shortened and production costs are reduced, and the titanium dioxide with high yield and high quality is obtained. The content of the contaminating metals is smaller than 10 ppm, preferably smaller than 8 ppm, more preferably smaller than 6 ppm, further preferably smaller than 5 ppm, most preferably smaller than 4 ppm, more preferably smaller than 2 ppm, or below the detection limit.

BRIEF DESCRIPTION OF THE DRAWINGS

FIG. 1 is a flow chart of the method of the present invention.

DETAILED DESCRIPTION OF THE INVENTION

For a further understanding of the present invention, the invention is further illustrated in detail in conjunction with the following examples, which are not to be construed as limiting the invention, but are to be construed as merely illustrative of the features and advantages of the invention and are not intended to limit the scope of the invention. Any equivalents of this invention in accordance with the present invention are intended to be within the scope of the present invention.

Example 1

(1) 1500 g of 37% concentrated hydrochloric acid was added to 500 g of high titanium slags and stirred, and the resulting mixture was heated to 60° C. The hydrogen chloride gas was introduced into the system to maintain the acid value of the system unchanged and the pressure of the system at 1.0 MPa, and the reaction was stopped after 9 hours. 40 g of $NaClO_3$ was added when the system was cooled to the room temperature, the reaction was continued under stirring for 1 h, filter-pressing was then carried out, and the filtering residues were washed to neutral. (2) At a temperature of 30° C., using TBP/MIBK (wt)=1:1 as an extractant and the ratio (O/A) of the oil phase to aqueous phase of 2:1, a three-stage extraction was carried out, wherein the oil phase is an iron extraction phase and the aqueous phase is a titanium containing residual phase. (3) The iron extraction phase was subjected to back extraction with the deionized water at O/A=1:10, and the oil phase extractant returned to the Fe extractor, the iron-containing aqueous phase was then purified similar to extraction-back extraction of steps (2) and (3), and part of the water was steamed out for concentration, so as to make the iron content reach 160 g/L. A multi-stage countercurrent extraction (V) was carried out with the extractant TBP/xylene=4:25 and O/A=2:1, the raffinate entered the purification extractor, TOA/toluene=1:9 and O/A=2:1 was adopted for the extraction of Mn, and the extraction liquid was subjected to back extraction to obtain a raffinate, namely titanium-rich $TiOCl_2$, Ti content of which can be up to 100000 ppm. The aqueous titanium-rich raffinate was added to the titanium extractor, extraction was carried out with TOA/toluene=1:9 and O/A=2:1 to obtain an organic phase containing high purity titanium ions (the content of the colored contaminating metals was below the detection limit). The latter directly was introduced into the titanium synthesis reactor, to which were added 20% sodium hydroxide solution to prepare the precipitates of titanium. Finally, titanium dioxide was obtained through post-treatment (see Table 2 for content of the contaminating metals).

TABLE 1 high titanium slags and acidolysis solution composition

| | $TiO_2$ | $\Sigma Fe$ | FeO | MgO | MnO | $SiO_2$ | $Al_2O_3$ | CaO |
|---|---|---|---|---|---|---|---|---|
| before acidolysis (%) | 49.6 | 15.2 | 10.88 | 1.05 | 2.07 | 1.11 | 2.24 | 1.34 |
| after acidolysis (g/L) | 192 | 24.96 | 68 | 0.103 | 0.11 | 0.038 | 0.174 | 0.091 |

TABLE 2

Determination of titanium dioxide product by ICP-MS (µg/g)

| | Ti | Na | Pb | Cr | Mn | Cu | Fe | V | As | Hg | Cd | Ni | Sb | Co | Zn | Al | Ba |
|---|---|---|---|---|---|---|---|---|---|---|---|---|---|---|---|---|---|
| Example 1 | 598620 | 10 | / | / | / | / | / | / | / | / | / | / | / | / | / | / | 2.0 |
| RSD (contrast) | 576430 | / | 5.1 | 8.0 | 2.0 | / | / | 9.9 | 12.0 | 18.2 | 11.1 | 5.5 | 6 | 15.8 | / | / | 6.2 |

Example 2

The process conditions are the same as those in Example 1, but titanium concentrate was used in stead of high titanium slags.

Example 3

The process conditions were the same as those in Example 1, but the modified titanium concentrate was used in stead of high titanium slags.

APPLICATION EXAMPLES

The pearlescent pigments prepared from the above examples 1-3 were used for the application fields of paints, coatings, printing inks, plastics, ceramic materials, leather coloring, wallpaper, powder coatings, cosmetics and the like. For example, a coating having excellent color and luster can be prepared by adding the pearlescent pigment of the present invention to the paints or coatings.

Application Example 1

Paint Spraying Application 4.00 grams of titanium dioxide were accurately weighed and added to an agitator along with 4.0 grams of butyl acetate and 8.0 grams of polyester automotive coating resin for agitation dispersion for 10 minutes, and 84.0 grams of automotive coating resin system was then added and stirred for 5 minutes. The viscosity of the coating was adjusted to No. Ford 4 cup 14-15 seconds before spraying. The temperature of the spraying chamber during spraying was controlled to be 25° C., while the relative humidity was controlled to be 60%. Varnish was overprinted after spraying twice and flash drying for 10 minutes, flash drying was carried out again followed by baking for 30 minutes at 140° C.

Application Example 2

Injection Molding Application 200 grams of polypropylene (PP) material dried under 105° C. was accurately weighed and placed in a sealed plastic bag, 1 ml of varnish (also known as dispersed oil) was added and then shaken, so that the varnish and the polypropylene material were fully mixed.

4.000 grams of titanium dioxide were weighted out by an analytical balance and added into the sealed plastic bag; the resulting mixture was then shaken and kneaded to allow the titanium dioxide to be substantially uniformly dispersed in PP particles.

After the temperature of a charging barrel of an extruder reached a set value (normally from 180° C. to 200° C.), well-batched polypropylene materials were added into the hopper; then, the original residual materials in the charging barrel were extruded out by using injecting and melting until new materials were extruded out, and the new materials that were extruded out should be free of impurities, black spots, scorches and bubbles; meanwhile, no plugging occurred in the nozzle during injecting. After two plastic sheets extruded successively were identical, plastic sheets manufactured subsequently were considered to be stable and qualified products, and continuous automatic production may be initated.

The invention claimed is:

1. A method for directly synthesizing titanium dioxide from a titanium-rich organic phase prepared from ilmenite, comprising the following steps:
    adding hydrochloric acid and ilmenite to a reactor to form a hydrochloric acid/ilmenite mixture having a mass ratio of 1-15:1, introducing a hydrogen chloride gas into the reactor, so that a pressure P in the reactor is higher than an atmospheric pressure, maintaining the reactor for reaction under stirring at a raised temperature T1 and the pressure P, after the reaction is completed, reducing the raised temperature T1, and adding an oxidizing agent thereto and stirring followed by filter-pressing to obtain a filtrate which is a hydrochloric acid solution A0 containing titanium and iron ions;
    adding the hydrochloric acid solution A0 into an iron extractor for a multi-stage extraction with an iron extractant, and combining extracts of the multi-stage extraction as organic phases to obtain an iron-rich extraction liquid, which is an organic phase A1, wherein an aqueous phase obtained from the multi-stage extraction is an iron ion-free titanium-containing raffinate, which is an aqueous phase B1;
    adding the iron-rich extraction liquid into an iron backwash extractor, and back-extracting iron ions with an iron back extractant to obtain an organic phase A2 and a raffinate B2 as a ferric chloride-containing aqueous phase;
    adding the iron ion-free titanium-containing raffinate to a purification extractor, and then carrying out multi-step purification with a purification extractant to remove colored ions so as to obtain an aqueous titanium-enriched raffinate C1; and
    adding the aqueous titanium-enriched raffinate C1 to a titanium extractor, extracting the aqueous titanium-enriched raffinate C1 with a titanium extractant to obtain an organic phase C2 containing high-purity titanium ions;
    causing organic phase C2 to enter a titanium dioxide synthesis reactor directly, adding a precipitant into the titanium dioxide synthesis reactor to prepare a titanium precipitate, and obtaining the titanium dioxide from the titanium precipitate.

2. The method according to claim 1, wherein the ilmenite is ilmenite concentrate, ilmenite, high titanium slag or modified ilmenite concentrate with a titanium dioxide content of 30-80 wt %.

3. The method according to claim 1, wherein the pressure P is in a range of 0.2 MPa to 1.6 MPa.

4. The method according to claim 1, wherein the hydrochloric acid/ilmenite mass ratio is 1.5 to 12:1; and/or the raised temperature T1 is 30° C. to 95° C.; and/or the reactor is maintained for the reaction for 2 hours to 12 hours.

5. The method according to claim 1, wherein concentration of the hydrochloric acid is from 25 wt % to 45 wt %; and/or wherein the oxidizing agent is selected from one or more of potassium chlorate, sodium chlorate, hydrogen peroxide, sodium peroxide, potassium peroxide, sodium percarbonate, potassium percarbonate, oxygen or air.

6. The method according to claim 1, wherein a content of contaminating or variegated metals in the obtained organic phase C2 is less than 10 ppm; and/or a content of contaminating metals in the obtained raffinate B2 is less than 15 ppm.

7. The method according to claim 1, wherein iron extractant is selected from one or more of tributyl phosphate, di(1-methylheptyl) methylphosphonate, methyl isobutyl ketone, trioctylamine, secondary carbon primary amine, methylbenzene, isoamyl alcohol or sulfonated kerosene.

8. The method according to claim 1, wherein one or more steps after obtaining the hydrochloric acid solution A0 are carried out at a temperature of 20° C. to 60° C.; and/or a mass ratio between the iron extractant and the titanium-iron hydrochloric acid solution A0 is 1-6:1.

9. The method according to claim 1, wherein the iron back extractant is selected from one or two of deionized water or dilute acid; and/or a mass ratio between the iron back extractant and the iron-rich extraction liquid is 3-12:1.

10. The method according to claim 1, wherein the purification extractant is selected from one or more of tributyl phosphate, trioctylamine, amyl acetate, bis(2-ethylhexyl) phosphate, methylbenzene, dimethylbenzene, isoamyl alcohol or sulfonated kerosene; and/or the mass ratio between the purification extractant and the iron ion-free titanium-containing raffinate is 1-6:1.

11. The method according to claim 1, wherein the titanium extractant is selected from one or more of tributyl phosphate, trioctylamine, amyl acetate, bis(2-ethylhexyl) phosphate, methylbenzene, dimethylbenzene, isoamyl alcohol sulfonated kerosene.

12. The method according to claim 1, wherein a mass ratio between the titanium extractant and the iron ion-free titanium-containing raffinate C1 is 1-6:1.

13. The method according to claim 1, characterized in that the precipitant in is selected from one or more of sodium hydroxide, ammonia water or sodium carbonate.

14. The method according to claim 1, wherein the obtained organic phase A2 after acid washing is used as the iron back extractant or returned to the iron extractant.

* * * * *